United States Patent [19] [11] Patent Number: 4,974,708
Maligne [45] Date of Patent: Dec. 4, 1990

[54] DRUM BRAKE WITH POSTPONED FITTING OF THE MECHANICAL CONTROL CABLE

[75] Inventor: Jean-Charles Maligne, Aubervilliers, France

[73] Assignee: Bendix France, Drancy, France

[21] Appl. No.: 357,454

[22] Filed: May 25, 1989

[30] Foreign Application Priority Data

Jun. 27, 1988 [FR] France ................................ 88 08586
Jan. 20, 1989 [FR] France ................................ 88 00654

[51] Int. Cl.⁵ ............................................ F16D 51/22
[52] U.S. Cl. .................................... 188/328; 74/502.6; 188/2 D; 188/106 A; 188/106 F; 188/325; 192/75; 192/99 B
[58] Field of Search ................. 188/2 D, 79.51, 79.54, 188/106 F, 106 A, 325, 327, 328, 331, 333, 336; 192/75, 99 B; 74/502.6

[56] References Cited

U.S. PATENT DOCUMENTS

| | | | |
|---|---|---|---|
| 3,064,767 | 11/1962 | Wieger | 188/78 |
| 3,517,779 | 6/1970 | Bolenbaugh | 188/78 |
| 4,146,117 | 3/1979 | Kawaguchi et al. | 188/79.5 P |
| 4,429,772 | 2/1984 | Roberts | 188/328 |
| 4,595,084 | 6/1986 | Le Deit | 188/328 |
| 4,753,325 | 6/1988 | Jaksic | 188/79.51 X |
| 4,872,533 | 10/1989 | Boyer et al. | 188/2 D |

FOREIGN PATENT DOCUMENTS

| | | |
|---|---|---|
| 0142421 | 5/1985 | European Pat. Off. . |
| 2020708 | 7/1970 | France . |
| 2033148 | 11/1970 | France . |
| 2303197 | 10/1976 | France . |
| 1095043 | 12/1967 | United Kingdom ............ 188/79.54 |

Primary Examiner—George E. A. Halvosa
Attorney, Agent, or Firm—Larry J. Palguta; Ken C. Decker

[57] ABSTRACT

The invention relates to a drum brake with two shoes, each having a web (16) and a rim (18), of which the face confronting the drum receives a friction lining (20). The drum brake is arranged on a supporting plate (10) and also includes a mechanical control lever (34) comprising a body of considerable length and of small thickness in relation to its width, the body having, at a first end (36), an orifice (38) intended for receiving an articulated connection with the web (16) of one of the shoes (14) at an intermediate point near the orifice, and a notch intended for interacting with a spacer (62) making it possible to subject the shoes (12, 14) to a stress moving them away from one another, and at the second end (40), a fastening point for an actuating cable (54) of the lever. The cable is equipped with a ferrule (60) at its end interacting with the lever. According to the invention, that face of the body confronting the web (16) is substantially plane between the first end (36) and an intermediate point (42) near the second end; at this latter point (42), the body is bent so as to define a part (44) diverging substantially from the web (16), the fastening point (48) being formed by bending the end part (46) of the second end (40) in such a way that it comes to rest between the web (16) and the part (44) diverging substantially from the web, all this in such a way that, between substantially the intermediate point (42) near the second end and the latter (40), the divergence between the web (16) and that part of the body confronting the web is substantially greater than the diameter of the cable (54) and less than that of the ferrule (60).

7 Claims, 3 Drawing Sheets

DRUM BRAKE WITH POSTPONED FITTING OF THE MECHANICAL CONTROL CABLE

The invention relates to drum brakes with two shoes, each having a web and a rim, of which the face confronting the drum receives a friction lining. Such a drum brake is generally arranged on a supporting plate and also includes a mechanical control lever comprising a body of considerable length and of small thickness in relation to its width. This body has, at a first end, an orifice intended for receiving an articulated connection with the web of one of the shoes at an intermediate point near this orifice, and a notch intended for interacting with a spacer making it possible to subject the shoes to a stress moving them away from one another and, at the second end, a fastening point for the actuating cable of the lever, the cable being equipped with a ferrule at its end interacting with the lever.

Such drum brakes are well known to an average person skilled in the art. The document EP-A-142,421 describes, for example, a mechanical control lever for such a brake. However, according to the teaching of this document, the control cable of the lever has to be mounted on the brake during the final phase of assembly of the latter. It is then customary to make one or more loops with the cable, to prevent the latter from causing too much obstruction during the mounting of the brake on the vehicle chassis. However, such loops still cause an obstruction for the motor-vehicle manufacturer, and it is desirable that it should be possible to postpone the fitting of the cable until all the components of the motor-vehicle chassis have been assembled and the cable can be fastened at its two ends.

The subject of the present invention is, therefore, a drum brake with postponed fitting of the mechanical control cable.

According to the invention, that face of the body of the lever confronting the web of the shoe is substantially planar between the first end and an intermediate point near the second end; at this latter point, the body is bent so as to define a part diverging substantially from the web, the fastening point being formed by bending the end part of the second end in such a way that it comes to rest between the web and the part diverging substantially from the web, all this in such a way that, between substantially the intermediate point near the second end and the latter, the divergence between the web and that part of the body confronting the web is substantially greater than the diameter of the cable and less than that of the ferrule.

Preferably, at the fastening point, the second end of the body has an offset defining a sufficient space between that face of the rim not having a friction lining and the body when the lever is in the position for receiving the ferrule with which the cable is equipped.

Also preferably, the edge of the second end of the body opposite the offset has a bevel making it possible to guide the ferrule during the installation of the cable.

According to a preferred embodiment, a trough fixed to the supporting plate makes it possible to guide the ferrule towards the second end of the body during the installation of the cable.

In order to allow the postponed fitting of the cable solely as a result of the manipulation of the protective sheath of this cable, preferably, a brace is arranged on the actuating cable between the ferrule and the inner end of the protective spring of the cable.

Preferably, this brace consists of a substantially rigid cylindrical tube which forms a pusher extending between the ferrule and the inner end of the spring and the diameter of which is less than on the spacing between the web of the shoe and that part of the body of the lever confronting this web. However, it can also consist of a washer crimped or shrunk onto the cable at a specific distance from the ferrule.

The invention will now be described by way of example with reference to the accompanying drawings in which.

Figure 1:
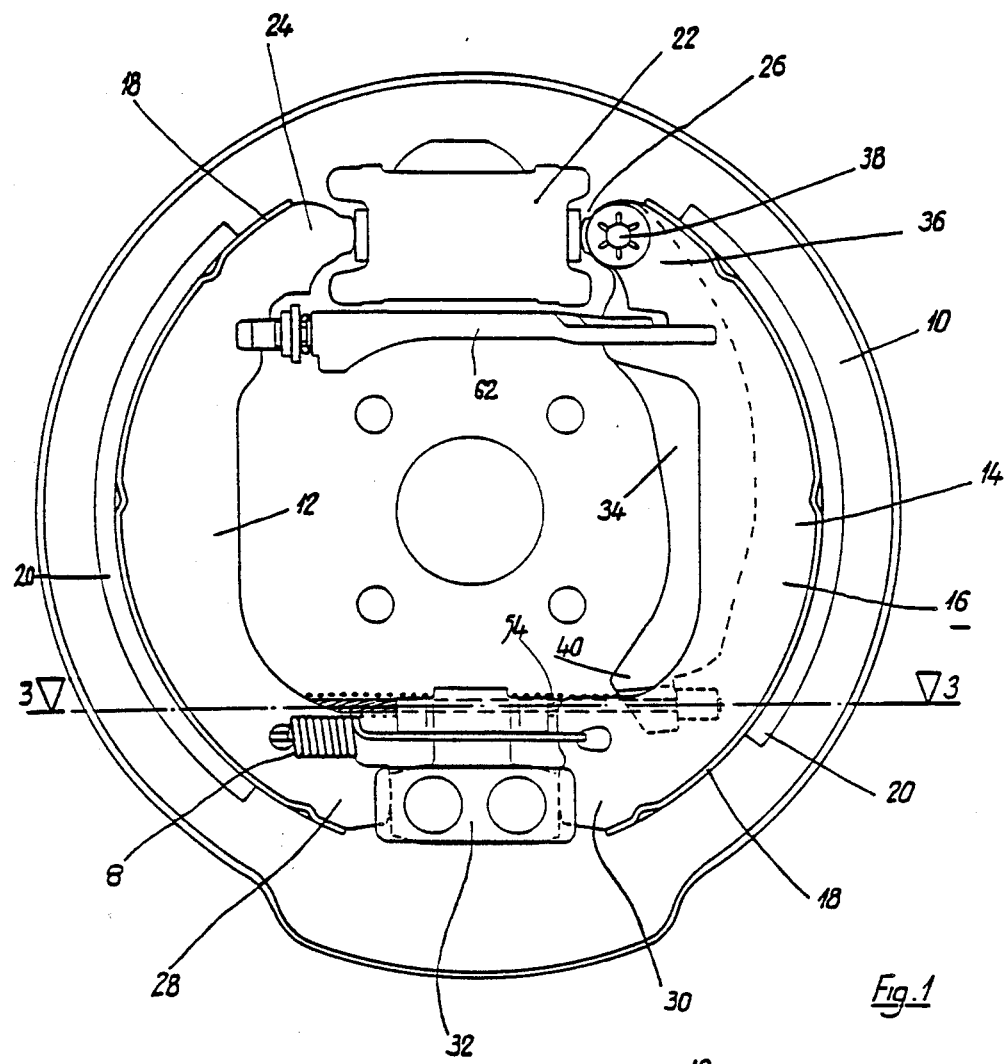
FIG. 1 shows a front view of a drum brake produced according to the present invention.

The drum brake illustrated in FIG. 1 comprises a supporting plate 10 which slidably receives two shoes 12 and 14, each comprising a web 16 and a rim 18, the latter receiving friction linings 20. These friction linings 20 are capable of coming into frictional engagement with a rotating drum (not shown) via a brake motor 22 located between two adjacent ends 24 and 26 of the shoes 12 and 14 respectively. The other two ends 28 and 30 of the shoes bear on an anchoring piece 32 by means of a spring 8, the anchoring piece 32 being fixed to the supporting plate 10. Likewise, a spring (not shown) keeps the ends 24 and 26 of the shoes up against the brake motor 22.

Conventionally in manual braking, the brake is actuated via a mechanical control device comprising a lever 34 articulated at one of its ends 36 on the shoe 14, more specifically near the end 26 of the latter, by means of a pin forming a pivot 38. The other free end 40 of the lever 34 interacts with an actuating cable 54 connected to a lever located in the vehicle interior (not shown). Conventionally, the lever 34 interacts with a spacer 62 in order to subject the ends 24 and 26 of the shoes to a stress moving them away from one another. The spacer 62 is capable of possessing an automatic adjustment device for compensating the wear of the friction elements 20.

Figure 2A:
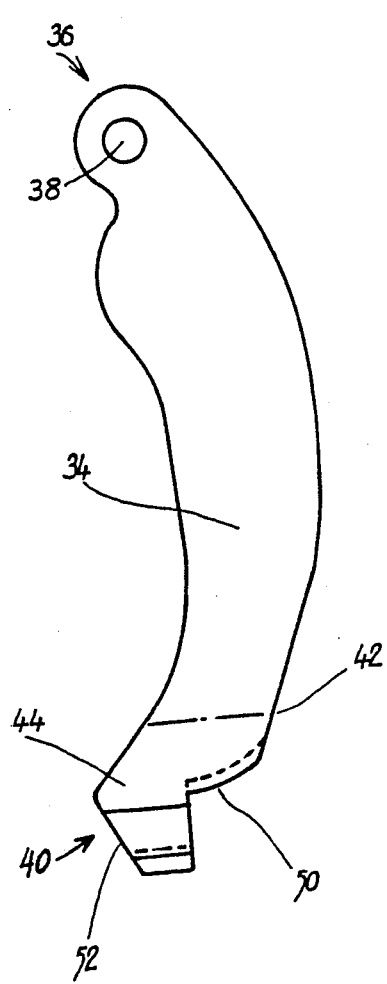
FIGS. 2a and b show respectively a front view and a profile view of a lever produced according to the invention.
Figure 2B:
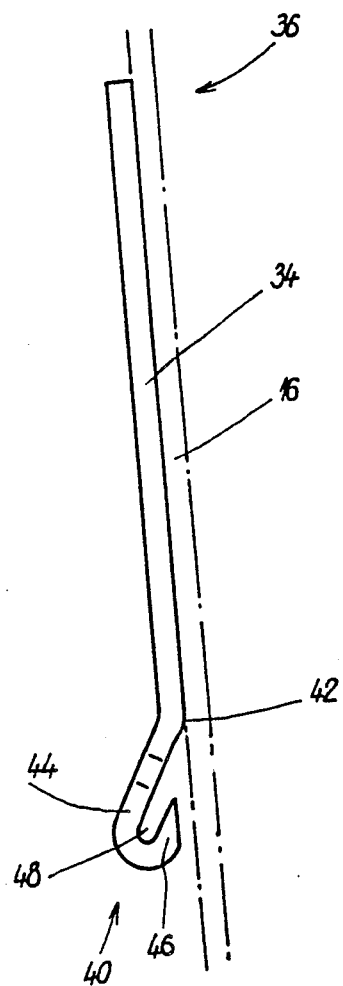

Referring now to FIGS. 2a and 2b which show the lever according to the invention in a front view and a profile view respectively, the lever 34 consists of a body of considerable length, for example approximately ten centimeters, and of small thickness in relation to its width. As can be seen from FIG. 2b, that face of the body confronting the web 16 of the shoe 14 is substantially planar up to the point 42 near the second end. At this point 42, the body is bent so as to define a part 44 diverging substantially from the web 16. The fastening point for the cable is then obtained by bending the end part 46 between the part 44 and the web 16. Since the cable is intended to come to rest in the space 48 so defined and forming the fastening notch after it has been installed, the divergence between the web and the second end of the body must be such that the cable itself can come to rest in the space 48 after having passed between the end part 46 and the web 16, while the ferrule which, for example, is crimped onto the end of the cable cannot pass into this space under any circumstances. Because of this, the divergence between the web 16 and that part of the body confronting the web, between substantially the point 42 and the second end, is substantially greater than the diameter of the cable, but less than that of the ferrule.

Preferably, the second end of the body has an offset 50 for defining a space between the rim (not shown in FIG. 2a) and the body, this space being intended for receiving the ferrule during the installation of the cable. Since the lever according to the invention is designed so that the cable can catch on it faultlessly, it is beneficial if the edge 52 of the second end opposite the offset 50 has a bevel making it possible to guide the ferrule during the installation of the cable.

Figure 3:
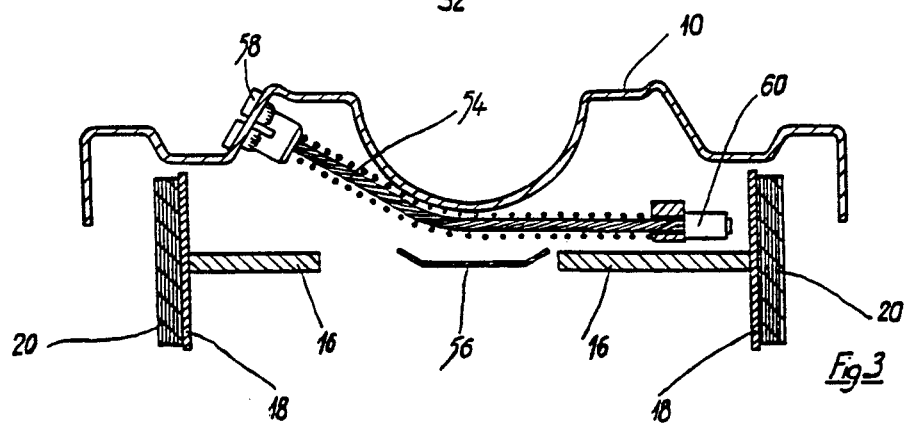
FIG. 3 shows a sectional view along the line 3—3 of FIG. 1, and FIGS. 4 and 5 show diagrammatically two embodiments of the brace according to the invention.

Finally, referring to FIG. 3, because of the unchanged shape of the supporting plate 10 and the location of the cable insertion orifice 58, it may be desirable to arrange a trough 56 fixed to the supporting plate, for example by means of the anchoring piece 32 (FIG. 1). This trough will assist the installation of the cable and will guide the ferrule 60 before the latter reaches the web 16 of the shoe.

In practice, when the brake has been assembled completely, with the exception of the cable, and then mounted on the axle stub of the wheel which it equips, the cable is installed in the following way.

In the first place, the protective sheath and the spring are made to slide at least partially, so as to bare part of the cable. The ferrule is then introduced via the orifice 58 provided for this purpose in the supporting plate 10. As a result of the rigidity of the cable, the ferrule reaches the trough 56 and is deflected towards the web 16 of the shoe. It comes along the web 16 up to the bevelled edge 52 of the body of the lever, which guides it until it comes in contact with that face of the rim 18 not carrying a friction lining. The relative angle of incidence between the ferrule and the face of the rim makes it possible, by virtue of the flexibility and rigidity of the cable, for the ferrule to continue its path by ascending (FIG. 1) while at the same time remaining in contact with the face of the rim 18. During this time, the cable arches and enters the space provided between the second end of the body of the lever and the web. The movement then continues until the cable comes opposite the space 48 forming the fastening notch, into which it falls, at the same time straightening itself. The cable is then pulled and the ferrule comes to rest in the offset 50 provided for this purpose. Since the cable is now tensioned, it can no longer arch so as to come out of the fastening point. The spring can then be introduced into the orifice, and then the sheath plug is installed in order to close the latter and receive the sheath.

Figure 4:
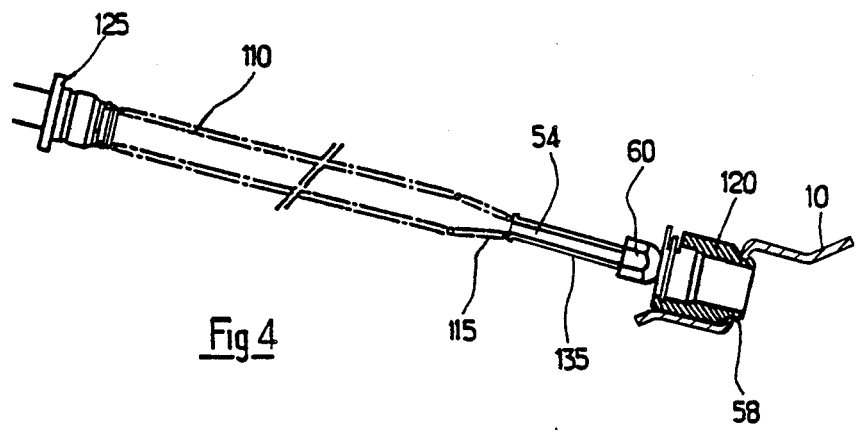
Figure 5:
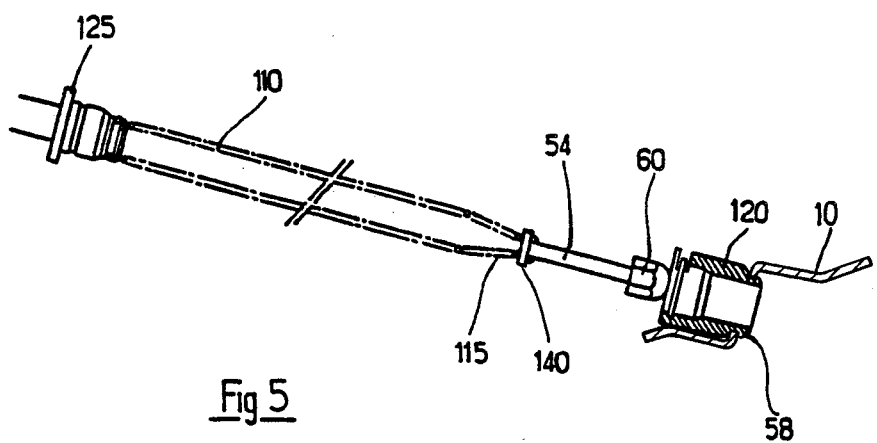

In order to allow the postponed fitting of the cable solely as a result of the manipulation of the protective sheath of this cable, reference is done to FIGS. 4 and 5 in which the cable/spring assembly has been shown before it is introduced into the orifice 58 provided in the supporting plate 10, the cable 54 is protected by helical spring 110.

The orifice 58 is equipped with a female part of a sheath catch 120, into which the male part 125 of the catch, fixed to the spring 110, engages in the final position.

A brace is arranged between the inner end 115 of the spring 110 and the ferrule 60, so as to keep this distance constant.

According to the embodiment illustrated in FIG. 4, this brace consists of a substantially rigid cylindrical tube 135, the end 115 of the spring 110 bearing on one end of the tube, the other of which bears on the ferrule 60. Of course, the diameter of the tube 135 must be such that it can enter the catching slot provided on the lever. Its diameter is therefore less than the spacing between the web of the shoe and that part of the body of the lever confronting this web.

According to the second embodiment illustrated in FIG. 5, this brace consists of a washer 140 fastened to the cable at the appropriate distance from the ferrule 60. Of course, this washer 140 can be crimped or shrunk on or fastened by any other means known to a person skilled in the art.

In practice, when the brake has been assembled completely, with the exception of the cable, spring and sheath, and then mounted on the axle stub of the wheel which it equips, the cable is installed in the following way.

The spring is first fitted onto the cable and the latter comes up against the brace, this being followed by the male part of the sheath catch and then the sheath. The operator subsequently introduces the assembly into the orifice 58, while holding the sheath.

As before, the movement continues and the ferrule comes in contact with the face of the rim.

If the brace is rigid, the lever lifts off, allowing the ferrule to come to rest in the recess provided for this purpose, otherwise the cable bends naturally and the ferrule comes to rest in the recess.

The male part 125 of the sheath catch thereby enters the corresponding female part 120 which is fixed to the plate 10 and into which it engages.

All that then remains is to tension the cable in the conventional way, since it is arranged in complete safety at the fastening point.

As can have been seen, the installation of the cable can be thus postponed until the end of assembly of the components of the chassis, and with the lever according to the invention the cable is arranged at the fastening point in complete safety.

Although only one preferred embodiment of the invention has been described, it is clear that many modifications can be made to it, without departing from the scope of the invention, as defined in the following claims.

We claim:

1. A drum brake with two shoes each having a web and a rim of which a face confronting the drum has a friction lining, said drum brake being arranged on a supporting plate and including a mechanical control lever comprising a body of considerable length and of small thickness in relation to its width, said body having, at a first end, an orifice receiving an articulated connection with the web of one of said shoes, and spaced apart from the orifice a notch interacting with a spacer for subjecting the shoes to a stress moving the shoes away from one another, and at a second end, a fastening point for an actuating cable equipped with a ferrule at an end of the cable interacting with said lever, a face of said body confronting said web being substantially planar between said first end and an intermediate point near the second end, and, at said intermediate point, said body being bent so as to define a part diverging substantially away from said web, said fastening point being formed by bending an end part of said second end in such a way that the end part is bent inwardly toward the web and a free end comes to rest between said web and said part diverging substantially away from said web, all in such away that between substantially said intermediate point near said second end and said second end the divergence between said web and an associated part of said body confronting said web is substantially greater than the diameter of said cable and less than the diameter of said ferrule, the associated part of said body confronting the web being disposed opposite a planar part of the web and extending into a single U-shaped end part which terminates in the free end which has an end surface facing said web and disposed parallel to the planar part of the web.

2. The drum brake according to claim 1, wherein at the fastening point said associated part of said body has an offset defining a sufficient space between the face of the rim not having a friction lining and said body when said lever rests on said rim, in order to receive said ferrule with which the cable is equipped.

3. The drum brake according to claim 2, wherein an edge of said second end of said body opposite the offset has a ferrule guidance bevel making possible a guidance of said ferrule during installation of said cable.

4. The drum brake according to claim 1, wherein a trough fixed to said supporting plate makes possible a guidance of said ferrule in an axial direction toward said support plate and tangentially toward said second end of said body during installation of said cable.

5. The drum brake according to claim 1, wherein a spring separating brace is arranged on the actuating cable between said ferrule and an end of a protective spring of said cable so that an end of the spring is kept spaced-apart from said ferrule.

6. The drum brake according to claim 5, wherein said brace consists of a substantially rigid cylindrical tube extending between said ferrule and the end of said spring.

7. The drum brake according to claim 5, wherein said brace consists of a washer fastened to the cable at a specific distance from said ferrule.

* * * * *